United States Patent [19]

Lundstrom

[11] Patent Number: 4,461,009
[45] Date of Patent: Jul. 17, 1984

[54] OUTPUT COUPLER FOR LASER RESONATOR

[75] Inventor: Eric A. Lundstrom, Ridgecrest, Calif.

[73] Assignee: The United States of America as represented by the Secretary of the Navy, Washington, D.C.

[21] Appl. No.: 302,346

[22] Filed: Sep. 15, 1981

[51] Int. Cl.³ .............................................. H01S 3/08
[52] U.S. Cl. ................................. 372/108; 372/105; 372/101; 372/106
[58] Field of Search ...................... 350/380, 400, 403; 372/9, 101, 105, 106, 96, 91, 100, 108

[56] References Cited

U.S. PATENT DOCUMENTS 3,663,087 5/1972 Guillet et al. ...................... 350/389
3,813,611 5/1974 Dahlstrom .......................... 372/18

OTHER PUBLICATIONS

"Radial Birefringent Element and its Application to Laser Resonator Design", Giuliani et al; Opt. Lett. vol. 5, No. 11, Nov. 1980.
"Dual-Polarized Ring Lasers"; Sanders et al; IEEE J. of Quant. Electron., vol. QE-13, No. 9, Sep. 1977.

Primary Examiner—William L. Sikes
Assistant Examiner—Léon Scott, Jr.
Attorney, Agent, or Firm—R. F. Beers; W. Thom Skeer; R. J. Veal

[57] ABSTRACT

A laser output coupler utilizes a birefrigent lens which has one side thereof curved so as to present a non-uniform polarization distribution across the face of the lens. A polarized beam splitter is employed to separate the output beam from the feedback beam; the feedback beam having a non uniform distribution across the laser aperture enhances mode discrimination of a pulsed resonator.

4 Claims, 4 Drawing Figures

OUTPUT COUPLER FOR LASER RESONATOR

BACKGROUND OF THE INVENTION

1. Field of the Invention:

This invention relates to the field of optics. More particularly the invention relates to that portion of optics dealing with polarized light. In still greater particularity this invention relates to the transverse distribution of light output by a beam splitter. By way of further characterization the invention may be described as an optical coupler for producing a non-uniform transverse distribution.

2. Description of the Prior Art:

Mode discrimination in coventional stable resonators with uniform feedback requires a low Fresnel number, an undesirable restriction for many applications. For conventional unstable resonators, output coupling is obtained using a scraper mirror, a mirror with a hole in it.

The scraper mirror produces a circular feedback beam. The resultant discontinuity at the edge of the feedback beam results in an extremely non-uniform mode shape at moderate Fresnel numbers. Further the output beam is in the shape of an annulus which may not be desirable.

It is known that a resonater with a Gaussian distribution of feedback has Gaussian modes regardless of the stability of the resonator. It is also known that mode discrimination is enhanced in such a resonator. Practical optical devices for producing transverse feedback distribution are not known to be available.

SUMMARY OF THE INVENTION

The optical coupler described herein may be used as a simple beam splitter or introduced into a laser resonator for the purpose of producing a non-uniform feedback distribution across the laser aperture. The optical component responsible for the feedback distribution is a lens constructed of a birefringent material having one face with a radius of curvature.

The optical elements in the resonator are configured so as not to disturb the phase of the feedback or output coupled beams.

OBJECTS OF THE INVENTION

It is an object of the invention to enhance mode discrimination for stable laser resonators.

Another object of the invention is to form a superior mode shape for unstable laser resonators.

Yet another object of the invention is to produce a transverse feedback distribution.

These and other objects and features of the invention will become apparent by a study of the description and the appended figures relating thereto.

DESCRIPTION OF PARTICULAR EMBODIMENTS

Figure 1:
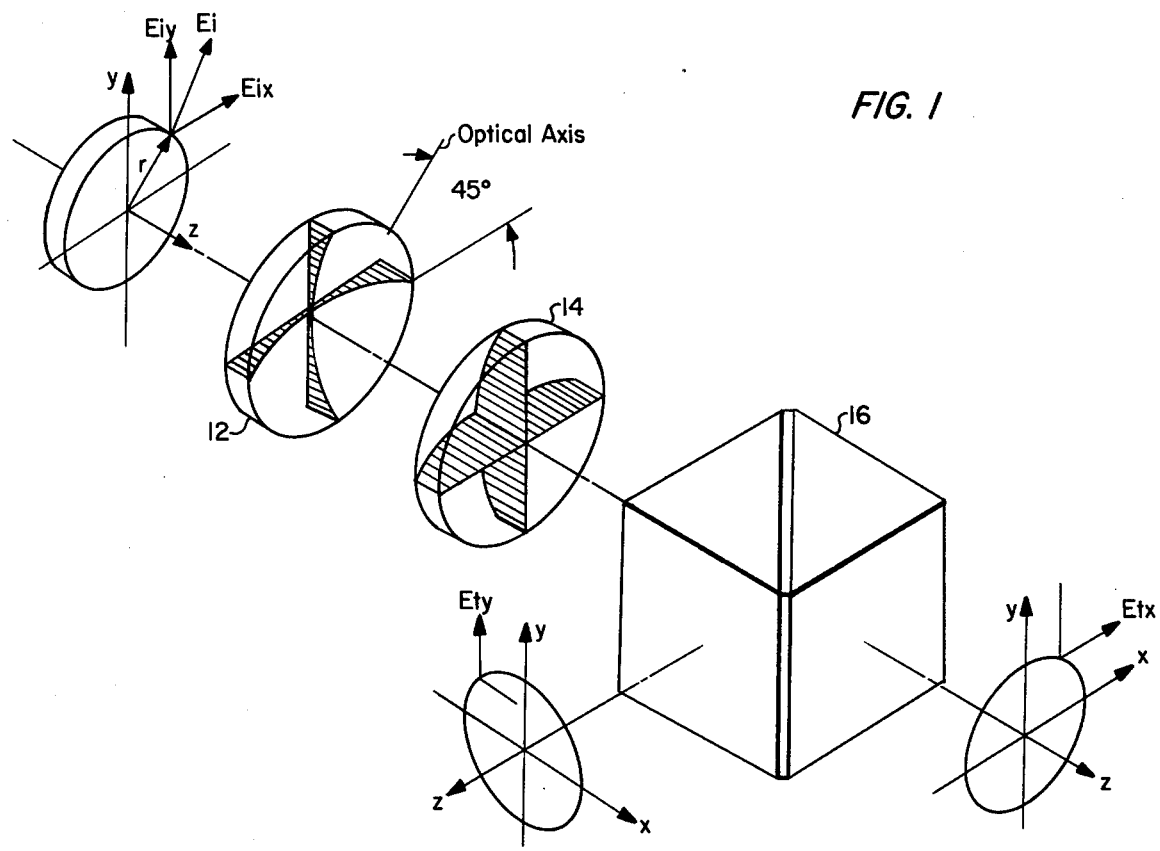
FIG. 1 is a representation of a beam splitter utilizing the present invention.

The beam splitter system shown in FIG. 1 is the simplest optical configuration containing the principles of the invention. A light beam is incident upon the system from the left. The beam first passes through a birefringent lens 12 which is constructed of a birefringent crystal such as quartz or calcite.

Birefringent lens 12 is constructed just as in an ordinary waveplate except that at least one face has a radius of curvature. A compensation lens 14 is included to modify or cancel the isotropic lensing of the birefringent lens.

After transmission through lenses 12 and 14, the light is split into two beams by a polarizer 16. One beam is transmitted by polarizer 16 and the other reflected. The performance of the beam splitter is best described using the Jones Calculus as follows.

The state of polarization of a ray is specified by an electric field vector, E, with complex components, $E_x$ and $E_y$, in the orthogonal x and y direction such that $$E = \begin{pmatrix} E_x \\ E_y \end{pmatrix}.$$

The ray is presumed to travel in the Z direction and the time variation of the field goes $\exp(i\omega t)$ where $\omega$ is angular frequency and t is time.

Transmission of a ray through an optical component is described by multiplying the incident electric field vector, $E_i$, by a $2 \times 2$ matrix, M, to obtain the transmitted field vector, $$E_z = M E_i.$$

For an ideal, lossless component, the matrix M is unitary and has the general form $$M = \begin{pmatrix} a & b \\ -b^* & a^* \end{pmatrix}$$

where a and b are complex numbers giving a unit determinent $$aa^* + bb^* = 1.$$

The asterisks indicate complex conjugates.

The polarization transmission matrix of a waveplate, $M_w$, is given by $$M_w = \begin{pmatrix} a_w & b_w \\ -b_w^* & a_w^* \end{pmatrix}$$

Eof the distance, r, from the lens centerline. The phase advance angle of the lens 12, $Q_l$, can therefore be expressed in the form $$Q_l = cr^2 + d$$

where c and d are constants determined by the lens material, the thickness of the lens at the center and the radius of curvature.

For the birefringent lens 12 in FIG. 1, $$P_w = P_l = 45°.$$

Therefore the polarization transmission matrix, $M_l$, for birefringent lens 12 is $$M_l = \begin{pmatrix} \cos\dfrac{Q_l}{2} & i\sin\dfrac{Q_l}{2} \\ i\sin\dfrac{Q_l}{2} & \cos\dfrac{Q_l}{2} \end{pmatrix}.$$

Polarization 16 in FIG. 1 acts as the beam splitter. It transmits the x component of the incident electric field vector and reflects the y component. The matrix giving transmission through the polarizer is $$M_{px} = \begin{pmatrix} 1 & 0 \\ 0 & 0 \end{pmatrix}$$

and the matrix giving reflection is $$M_{py} = \begin{pmatrix} 0 & 0 \\ 0 & 1 \end{pmatrix}.$$

The total polarization transmission matrix, $M_x$, for transmission through the birefringent lens 12 and polarizer 16 is given by the product of the individual matrices given for each component such that $$M_x = M_{px} M_l = \begin{pmatrix} \cos Q_{l/2} & i\sin Q_{l/2} \\ 0 & 0 \end{pmatrix}.$$

Similarly, the total matrix, $M_{py}$, for transmission through birefringent lens 12 and reflection by polarizer 16 is given by the product $$M_y = M_{py} M_l = \begin{pmatrix} 0 & 0 \\ i\sin Q_{l/2} & \cos Q_{l/2} \end{pmatrix}$$

By way of illustration suspose the input beam is uniform with unit amplitude and polarized in the x direction such that $$E_i = \begin{pmatrix} 1 \\ 0 \end{pmatrix}.$$

The electric field vector transmitted through the polarizer, $E_{tx}$, is given by the product $$E_{tx} = M_x E_i = \begin{pmatrix} \cos Q_{l/2} \\ 0 \end{pmatrix}.$$

The transmitted electric field vector is therefore polarized in The x direction and has an intensity of $$|E_{tx}|^2 = \cos^2 Q_{l/2} = \cos^2\left(\dfrac{cr^2 + d}{2}\right)$$

where $$Q_l = cr^2 + d$$

as noted earlier. Since $E_{tx}$ is real, the phase is uniform.

The electric field vector reflected from polarizer 16, $E_{ty}$, is similarly given by the product $$E_{ty} = M_y E_i = \begin{pmatrix} 0 \\ i\sin Q_{l/2} \end{pmatrix}.$$

The reflected electric field vector is polarized in the y direction, has an intensity of $$|E_{ty}|^2 = \sin^2 Q_{l/2} = \sin^2\left(\dfrac{cr^2 + d}{2}\right)$$

and has a uniform phase.

Both the transmitted and reflected components of the electric field vector, $E_{tx}$ and $E_{ty}$, have uniform phase. This is essential to proper operations. It should be noted that the polarization of the input wave must be aligned with either the x or y axes for a wave with uniform phase to result since the off diagonal elements in the equation for the system transmission matrix $M_x$ and for the reflection matrix $M_y$ are imaginary.

Figure 2:
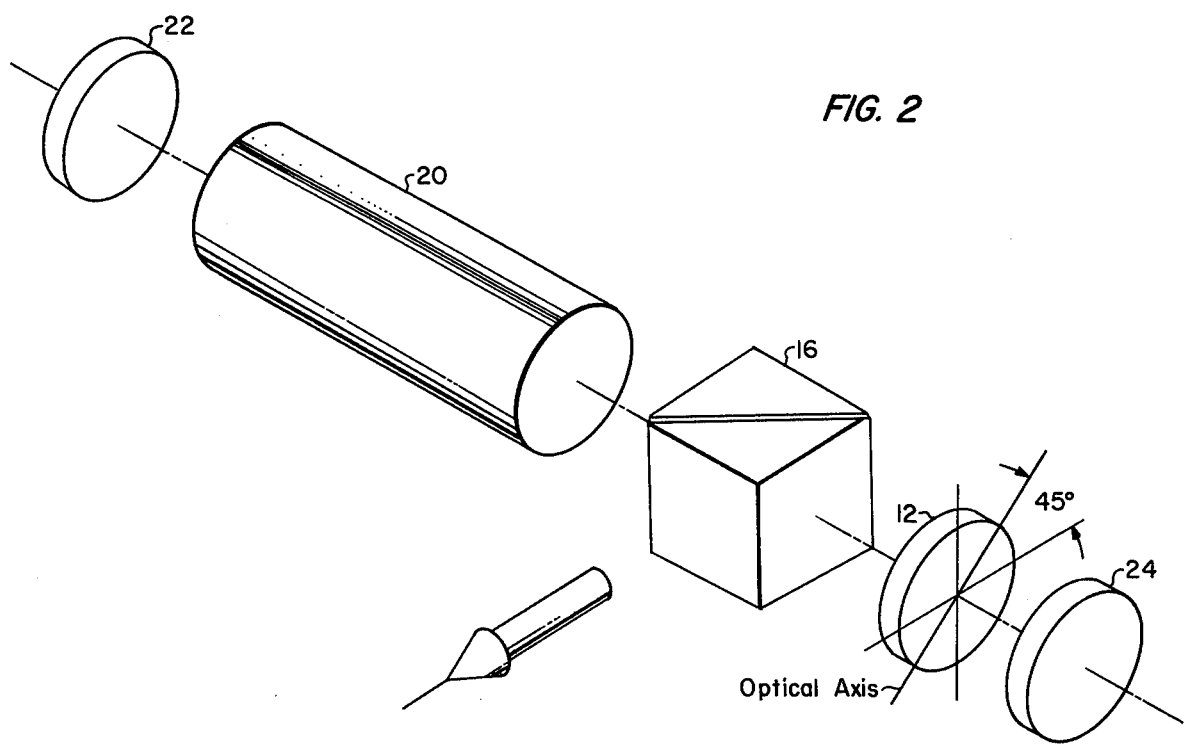
FIG. 2 is a representation of a generic laser with its output coupled by the present invention.

Use of the birefringent lens in a laser resonator depends on the properties of the lasing medium and the ultimate use of the laser. FIG. 2 represents a generic laser resonator using a gain medium 20 which does not influence polarization. Birefringent lens 12 and polarizer 16 are the same as in FIG. 1. The remainder of the resonator as shown consists of a rear mirror 22 and a front mirror 24. The curvature of mirrors 22 and 24 can be varied to give a desired stability and mode volume to the resonator.

The polarization transmission matrix, $M_x$, for a round trip through polarizer 16 and birefringent lens 12 is given by the product $$m_x = M_{px} M_l M_l M_{px}$$

where $$M_{px} = \begin{pmatrix} 1 & 0 \\ 0 & 0 \end{pmatrix} \text{ and}$$

$$M_l = \begin{pmatrix} \cos Q_{l/2} & i\sin Q_{l/2} \\ i\sin Q_{l/2} & \cos Q_{l/2} \end{pmatrix}$$

noted herein above, such that $$M_x = \begin{pmatrix} \cos Q_l & 0 \\ 0 & 0 \end{pmatrix}.$$

The laser feedback, f, is therefore $$f = \cos^2(cr^2 + d).$$

Figure 3:
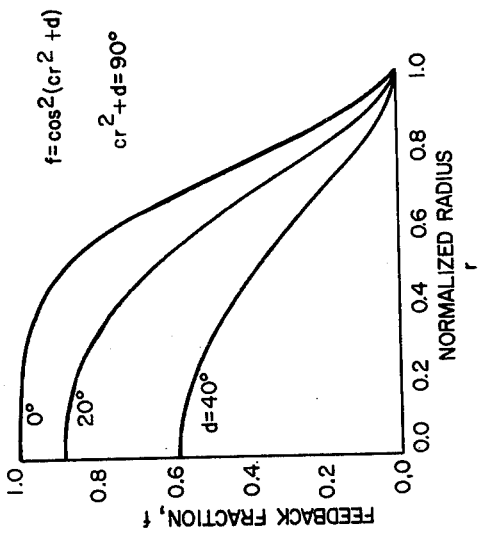
FIG. 3 is a graphic representation of the feedback distribution possible with the present invention.

FIG. 3 illustrates some possible feedback distributions allowed by the above relationship.

Figure 4:
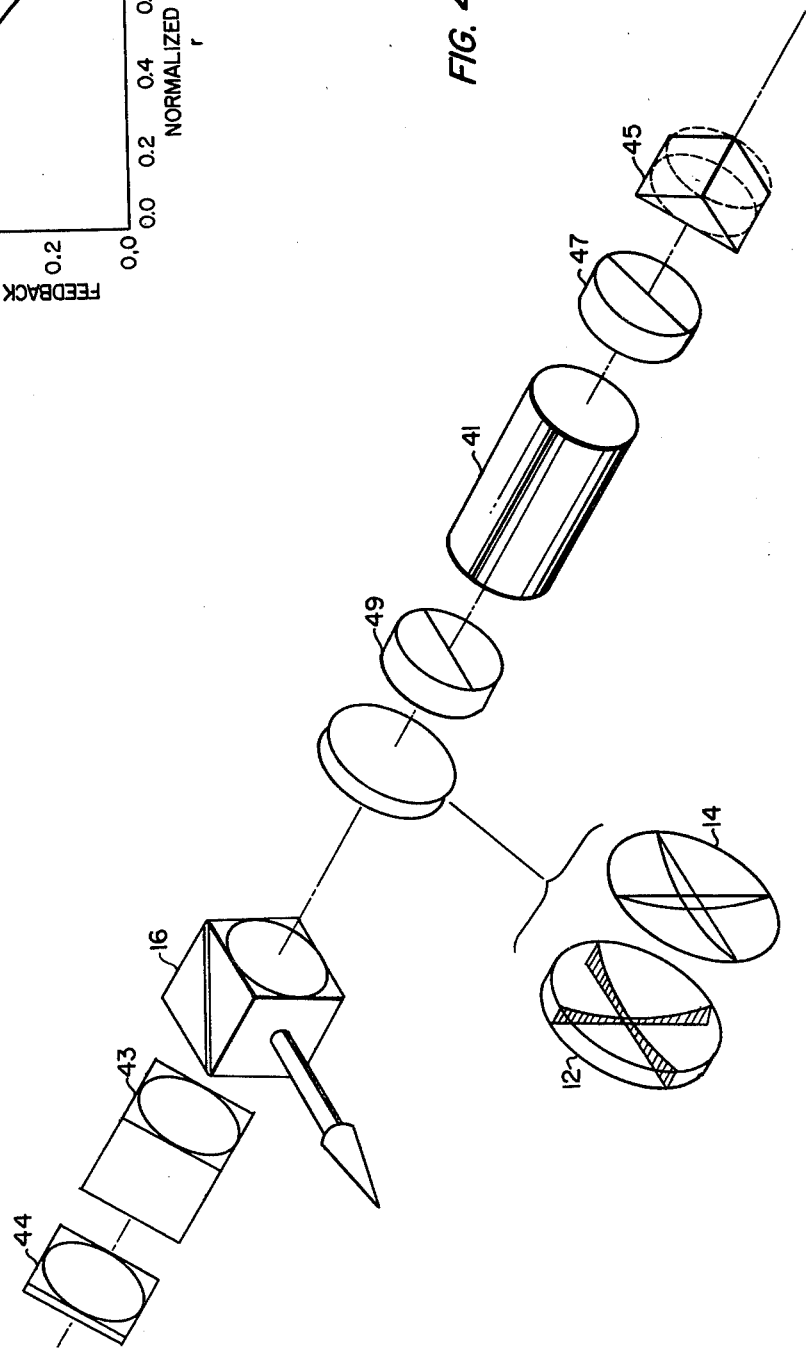
FIG. 4 is a representation of specific laser employing the present invention as its output coupler.

A more specific embodiment of the invention is shown in FIG. 4. The resonator is one used in military target designators and rangefinders. It employs a flash lamp 40, Nd:YAG rod 41 and is pulsed using a Pockel cell Q switch 43. The resonator features two crossed Porro prisms 44 and 45 which give exceptional insensitivity to angular misalignments. Laser rod 41 is affected by thermally induced stress birefringence which can be cancelled using a particular waveplate 47. For stress birefringence cancellation, the round trip polarization transmission matrix, $M_c$, for waveplate 47 and polarizer 16 is $$M_c = \begin{pmatrix} -i \sin 2P_p & i \cos 2P_p \\ i \cos 2P_p & i \sin 2P_p \end{pmatrix}$$

where $P_P$ is the angle of the Porro prism roof edge with respect to the x axis.

A quarter-wave plate 49 is shown in FIG. 4 with the optical axis aligned with the x axis demonstrated in FIG. 1. The polarization transmission matrix $M_q$ for quarter wave plate 49 is obtained as was $M_w$ herein above with $Q_w = \pi/2$ radians and $P_w = 0$. The result is $$M_q = \begin{pmatrix} e^{i\pi/4} & 0 \\ 0 & e^{-i\pi/4} \end{pmatrix}.$$

The total round trip matrix for lens 12, quarter-wave plate 49, compensation plate 47 and Porro prism 45 is given by the matrix product $$M_F = M_l M_q M_c M_q M_l$$

with the result that $$M_F = \begin{pmatrix} \sin(2P_p - Q_l) & i \cos(2P_p - Q_l) \\ i \cos(2P_p - Q_l) & \sin(2P_p - Q_l) \end{pmatrix}$$

Quarter-waveplate 49 may be omitted if the angle of Porro prism 45 is restricted to 0 or 90 degrees. For the case of 0° the round trip polarization matrix, $M_F$, is $$M_F = \begin{pmatrix} -\sin Q_l & i \cos Q_l \\ i \sin Q_l & -\sin Q_l \end{pmatrix}.$$

Both matrices for $M_F$ have either real or imaginary diagonal and off-diagonal elements therefore, subsequent transmission through or reflection from the polarizer does not induce any additional phase distortion.

As can be seen from FIG. 3, with the proper choice of lens parameters, c and d various functions may be performed including selective transverse feedback distribution for mode discrimination enhancement and mode shaping.

It is to be understood that the figures and description thereof herein are provided for illustrative purposes only as numerous modifications may be made to the presentation herein without departing from the scope and principles of the invention which are defined by the appended claims.

What is claimed is:

1. Output coupler apparatus in a flash lamp pumped laser resonator where said resonator includes (1) a first Porro prism and (2) a second Porro prism, said first and second Porro prisms being crossed Porro prisms, (3) a Pockel cell Q-switch, said Q-switch positioned adjacent said first Porro prism and between said first and said second Porro prisms, (4) stress birefringence compensating waveplate apparatus, said compensating apparatus positioned adjacent said second Porro prism and between said Q-switch and said second Porro prism, (5) a Nd:YAG laser rod, said laser rod positioned adjacent said compensating apparatus and between said Q-switch and said compensating apparatus, and, (6) a quarter-wave plate, said quarter-wave plate positioned adjacent said laser rod and between said laser rod and said Q-switch, said output coupler apparatus comprising:

a birefringent lens, said lens having a face having a radius of curvature and positioned in said resonator to interact with laser light produced in said resonator, said lens positioned adjacent said quarter-wave plate and between said quarter-wave plate and said Q-switch, said lens having a phase advance angle predetermined by lens parameters selected to produce said angle, said lens parameters being a lens material, the centerline thickness of said lens and the radius of curvature of said lens; and, laser light polarizing means, positioned in said resonator between said Q-switch and said birefringent lens, for splitting said laser light into a reflected light beam and a transmitted light beam, said transmitted light beam being fed back for use in said resonator and having a predetermined nonuniform feedback distribution, said nonuniform feedback distribution being a function of said phase advance angle of said birefringent lens.

2. The output apparatus according to claim 1 wherein the optical axis of said birefringent lens is oriented at 45° with respect to the horizontal and vertical axes of said apparatus, said orientation resulting in said light beam transmitted by said polarizing means being a light beam of uniform phase.

3. The output coupler apparatus according to claim 1 further comprising:

a compensation lens, said compensation lens positioned adjacent said birefringent lens and between said birefringent lens and said quarter-wave plate, said compensation lens modifying the isotropic lensing of said birefringent lens.

4. The output coupler apparatus according to claim 3 wherein the optical axis of said birefringent lens is oriented at 45° with respect to the horizontal and vertical axes of said apparatus, said orientation resulting in said light beam transmitted by said polarizing means being a light beam of uniform phase.

* * * * *